(12) United States Patent
Chung et al.

(10) Patent No.: US 8,599,782 B2
(45) Date of Patent: Dec. 3, 2013

(54) METHOD FOR PERFORMING A HARQ OPERATION IN A RADIO COMMUNICATIONS SYSTEM, AND METHOD AND APPARATUS FOR ALLOCATION OF SUBFRAMES

(75) Inventors: Jae Hoon Chung, Gyeongki-do (KR); So Yeon Kim, Gyeongki-do (KR); Moon Il Lee, Gyeongki-do (KR); Kyu Jin Park, Gyeongki-do (KR); Hyun Soo Ko, Gyeongki-do (KR); Seung Hee Han, Gyeongki-do (KR); Yeong Hyeon Kwon, Gyeongki-do (KR)

(73) Assignee: LG Electronics Inc., Seoul (KR)

( * ) Notice: Subject to any disclaimer, the term of this patent is extended or adjusted under 35 U.S.C. 154(b) by 208 days.

(21) Appl. No.: 13/128,296

(22) PCT Filed: Nov. 10, 2009

(86) PCT No.: PCT/KR2009/006594
§ 371 (c)(1),
(2), (4) Date: May 9, 2011

(87) PCT Pub. No.: WO2010/053339
PCT Pub. Date: May 14, 2010

(65) Prior Publication Data
US 2012/0033588 A1  Feb. 9, 2012

Related U.S. Application Data

(60) Provisional application No. 61/113,210, filed on Nov. 10, 2008, provisional application No. 61/117,944, filed on Nov. 25, 2008, provisional application No. 61/157,168, filed on Mar. 3, 2009, provisional application No. 61/157,173, filed on Mar. 3, 2009, provisional application No. 61/235,673, filed on Aug. 20, 2009.

(51) Int. Cl.
*H04B 7/14* (2006.01)
*H04W 4/00* (2009.01)

(52) U.S. Cl.
USPC .......................................... 370/329; 370/315

(58) Field of Classification Search
None
See application file for complete search history.

(56) References Cited

U.S. PATENT DOCUMENTS 6,115,390 A    9/2000  Chuah
6,879,831 B2 *  4/2005  Hamabe ........................ 455/442

(Continued)

OTHER PUBLICATIONS

International Search Report from PCT/KR2009/006594 (PCT corresponding to present application).

*Primary Examiner* — Hassan Phillips
*Assistant Examiner* — Hicham Foud
(74) *Attorney, Agent, or Firm* — Morgan, Lewis & Bockius LLP

(57) ABSTRACT

There is provided a method for allocating subframes in a radio communications system that performs communication by using a radio frame including a plurality of subframes, the method including: selecting a backhaul downlink subframe in which a base station is to transmit a signal to a relay station; and allocating the backhaul downlink subframe to a substitution subframe which is not limitation subframes, when the selected backhaul downlink subframe corresponds to one of the limitation subframes, wherein the limitation subframes are subframes in which the relay station is to transmit essential information to a relay user equipment. Therefore, it is possible to overcome a limitation that is present in a link between the base station and the relay station, perform an HARQ operation, and improve the efficiency of radio resource allocation.

12 Claims, 21 Drawing Sheets

(56) References Cited

U.S. PATENT DOCUMENTS

| | | | |
|---|---|---|---|
| 7,881,236 B2 * | 2/2011 | Park et al. | 370/278 |
| 8,040,827 B2 * | 10/2011 | Kwon et al. | 370/295 |
| 8,149,792 B2 * | 4/2012 | Hu et al. | 370/335 |
| 8,289,935 B2 * | 10/2012 | Frederiksen et al. | 370/337 |
| 2007/0060050 A1 | 3/2007 | Lee et al. | |
| 2008/0130611 A1 | 6/2008 | Branlund et al. | |
| 2008/0159217 A1 | 7/2008 | Chang et al. | |
| 2010/0080139 A1 * | 4/2010 | Palanki et al. | 370/252 |
| 2010/0080166 A1 * | 4/2010 | Palanki et al. | 370/315 |
| 2010/0097978 A1 * | 4/2010 | Palanki et al. | 370/315 |
| 2010/0150022 A1 * | 6/2010 | Cai et al. | 370/254 |
| 2010/0316096 A1 * | 12/2010 | Adjakple et al. | 375/211 |
| 2012/0092999 A1 * | 4/2012 | Chen et al. | 370/241 |

* cited by examiner

METHOD FOR PERFORMING A HARQ OPERATION IN A RADIO COMMUNICATIONS SYSTEM, AND METHOD AND APPARATUS FOR ALLOCATION OF SUBFRAMES

The present application is a national stage of PCT International Application No. PCT/KR2009/006594, filed Nov. 10, 2009, and claims the benefit of U.S. Provisional Application Nos. 61/113,210 filed Nov. 10, 2008, 61/117,944, filed Nov. 25, 2008, 61/157,168, filed Mar. 3, 2009, 61/157,173, filed Mar. 3, 2009, and 61/235,673, filed Aug. 20, 2009.

TECHNICAL FIELD

The present invention relates to a radio communications, and more particularly, to a method for allocating subframes in a radio communications system.

BACKGROUND ART

The radio communication system according to the related art includes a mobile station (MS) and a base station (BS) providing a service within a cell, which is a predetermined area. The quality of a transmission signal in a radio channel between the mobile station and the base station may be affected by a change in a radio environment. Particularly, the radio channel changes over time due to various forms of surrounding scatters, movement of the mobile station, or the like. In addition, since a reception power is rapidly reduced in accordance with an increase in a distance between radio communications subjects, there is a restriction in the distance. Therefore, the mobile station may generally communicate with the base station when it is within the coverage of the base station. As described above, a maximum transmission speed between the base station and the mobile station, a throughput of users within a cell, and a throughput of all cells are reduced due to factors such as the scatters, a moving speed of the mobile station, a distance of transmitting and receiving devices, or the like. For example, in the case in which the mobile station is positioned at a cell boundary or there is an obstacle such as a building between the mobile station and the base station, the communications quality between the mobile station and the base station may not be good.

One of the solutions for overcoming the above-mentioned problem is to introduce a relay station (RS) into a radio communications system. The relay station indicates a device that relays a signal between the mobile station and the base station. It is expected that effects such as the improvement of the throughput of the radio communications system, the extension of the coverage, or the like, will be accomplished by introducing various technologies capable of compensating for deterioration of the transmission signal between the base station and the mobile station into the relay station.

However, there are considerations in the case in which the relay station is introduced into the radio communications system. For example, there may be a limitation between the base station and the relay station in that specific subframes may not be used for the base station to transmit a signal to the relay station. In the case of using a frequency division duplex (FDD) scheme in the radio communications system, the base station may not transmit the signal to the relay station in the subframes having subframe indices within a radio frame corresponding to 0, 4, 5, and 9. The reason is due to self-interference and the fact that the relay station should transmit essential information to the mobile station connected thereto in the above-mentioned specific subframes. The self-interference is generated because a frequency band in which the relay station receives the signal from the base station is the same as that in which the relay station transmits the signal to a relay user equipment. That is, the relay station should transmit essential signals to the mobile station connected thereto in the subframes having the subframe indices corresponding to 0, 4, 5, and 9, and it is difficult for the relay station to receive the signal from the base station due to the self-interference in the subframes in which it transmits these essential signals.

The above-mentioned limitation may also be problematic in the case in which a hybrid automatic repeat request (HARQ) operation is performed between the base station and the relay station. For example, a case where the base station transmits or retransmits data to the relay station in the subframes in which the transmission from the base station to the relay station is limited may occur.

Therefore, a need exists for a method for allocating subframes in consideration of a limitation that is present in a link between a base station and a relay station in a radio communications system.

DISCLOSURE

Technical Problem

The present invention provides a method and an apparatus for allocating subframes in a radio communications system in consideration of a limitation that is present in a link between a base station and a relay station. The present invention also provides a method for performing a hybrid automatic repeat request (HARQ) operation.

Technical Solution

In an aspect, there is provided a method for allocating subframes in a radio communications system that performs communication by using a radio frame including a plurality of subframes, the method including: selecting a backhaul downlink subframe in which a base station is to transmit a signal to a relay station; and allocating the backhaul downlink subframe to a substitution subframe which is not limitation subframes, when the selected backhaul downlink subframe corresponds to one of the limitation subframes, wherein the limitation subframes are subframes in which the relay station is to transmit essential information to a relay user equipment.

In another aspect, there is provided a method for performing a hybrid automatic repeat request (HARQ) operation in a relay station, the method including: receiving data in a substitution subframe selected by a base station; and transmitting an ACK/NACK for the data to the base station, wherein the substitution subframe is a subframe which is not limitation subframes, and the limitation subframes are subframes in which the relay station is to transmit essential information to a relay user equipment.

In another aspect, there is provided an apparatus including: a radio frequency (RF) unit transmitting and receiving radio signals; and a processor connected to the RF unit, wherein the processor selects a backhaul downlink subframe in which a signal is to be transmitted to a relay station and allocates the backhaul downlink subframe to a substitution subframe which is not limitation subframes when the selected backhaul downlink subframe corresponds to one of the limitation subframes, the limitation subframes being subframes in which the relay station is to transmit essential information to a relay user equipment.

Advantageous Effects

As set forth above, according to the exemplary embodiment of the present invention, it is possible to overcome a limitation that is present in a link between the base station and the relay station, perform an HARQ operation, and improve the efficiency of radio resource allocation. In addition, when the relay station is introduced into the existing radio communications system such as a 3GPP LTE, backward compatibility may be provided.

MODE FOR INVENTION

The 3rd generation partnership project long term evolution (3GPP LTE), which is a portion of an evolved-universal mobile telecommunications system (E-UMTS) using an evolved-universal terrestrial radio access network (E-UTRAN), uses an orthogonal frequency division multiple access (OFDMA) in a downlink and uses a single carrier-frequency division multiple access (SC-FDMA) in an uplink. An LTE-advanced (LTE-A) is the evolution of the LTE. Hereinafter, in order to clarify the description of the present invention, the present invention will mainly describe the 3GPP LTE/LTE-A. However, the present invention may also be applied to other systems such as IEEE 802 16m.

Figure 1:
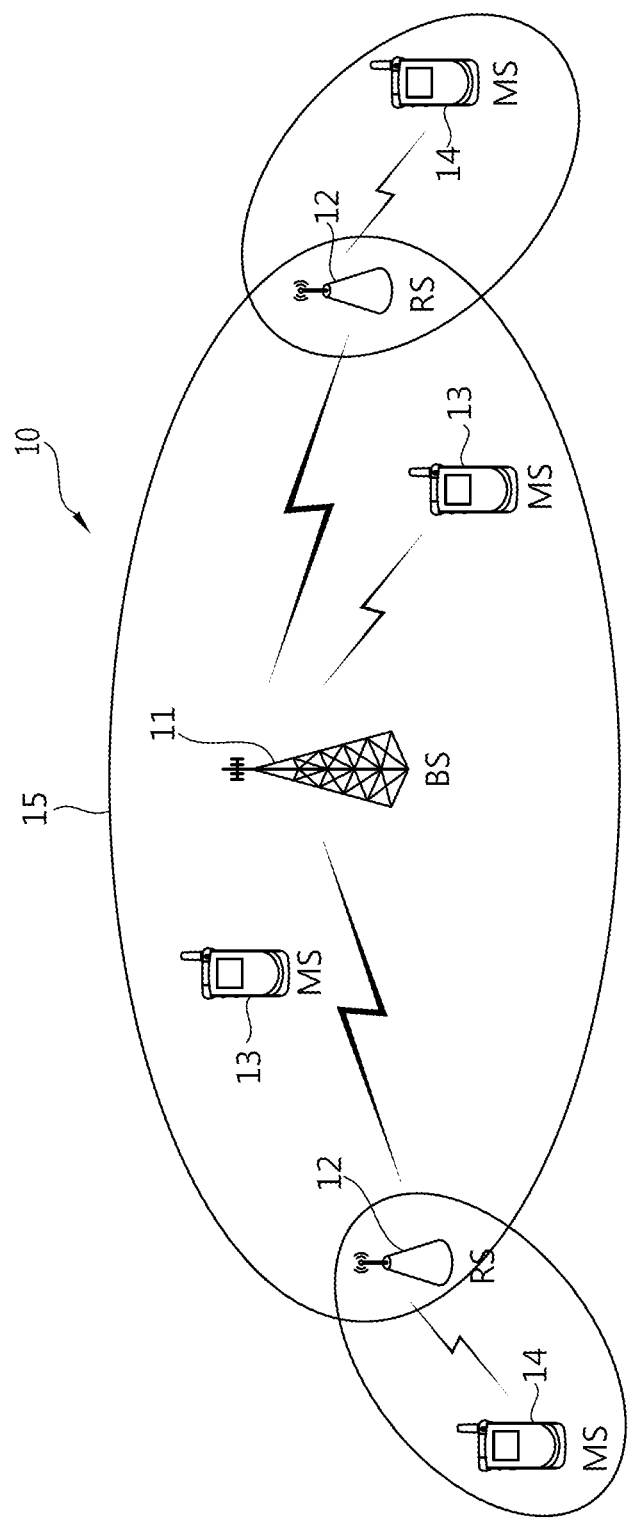
FIG. 1 shows a radio communications system including a relay station.

FIG. 1 shows a radio communications system including a relay station.

Referring to FIG. 1, a radio communications system 10 including a relay station includes at least one base station (BS) 11. Each base station 11 generally provides a communications service to a specific geographical area 15 called a cell. The cell may be again divided into a plurality of regions each referred to as a sector. One base station may include at least one cell. The base station 11 generally means a fixed station that communicates with a user equipment 13, and may be referred to as other terms such as an evolved-NodeB (ENB), a base transceiver system (BTS), an access point, an access network (AN), or the like. The base station 11 may perform functions such as connectivity, management, control and resource allocation between a relay station 12 and a user equipment 14.

The relay station (RS) 12 means a device that relays a signal between the base station 11 and the user equipment 14, and may be referred to as other terms such as a relay node (RN), a repeater, or the like. As a relay scheme used in the relay station, any scheme such as an amplify and forward (AF) scheme, a decode and forward (DF) scheme, or the like, may be used. However, the technical spirit of the present invention is not limited thereto.

The user equipments (UEs) 13 and 14 may be fixed or mobile, and may be referred to as other terms such as a mobile station (MS), a user terminal (UT), a subscriber station (SS), a wireless device, a personal digital assistant (PDA), a wireless modem, a handheld device, an access terminal, or the like. Hereinafter, a macro user equipment (Ma UE) 13 indicates a user equipment that directly communicates with the base station 11, and a relay user equipment (Re UE) 14 indicates a user equipment that communicates with the relay station.

A link between the base station 11 and the relay station 12 is called a backhaul link, and a link between the relay station 12 and the relay user equipment 14 is called an access link. The communication from the base station 11 to the relay station 12 is called a backhaul downlink, and the communication from the relay station 12 to the base station 11 is called a backhaul uplink. The communication from the relay station 12 to the relay user equipment 14 is called an access downlink, and the communication from the relay user equipment 14 to the relay station 12 is called an access uplink.

The backhaul downlink and the backhaul uplink may be operated in a frequency division duplex (FDD) mode or a time division duplex (TDD) mode. The access downlink and the access uplink may also be operated in the FDD mode or the TDD mode.

Figure 2:
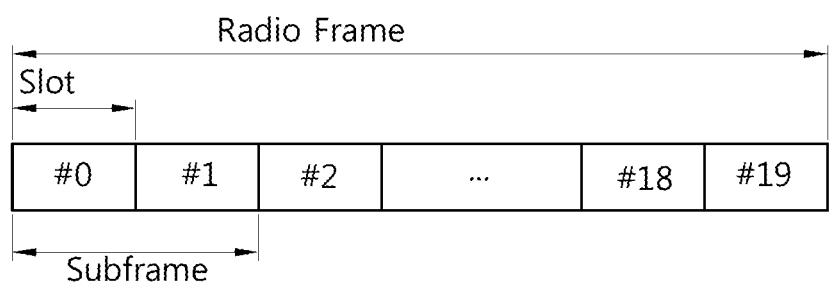
FIG. 2 shows a structure of a frequency division duplex (FDD) radio frame of a 3rd generation partnership project long term evolution (3GPP LTE) system.

FIG. 2 shows a structure of an FDD radio frame of a 3 GPP LTE system. This may refer to section 4.1 of 3GPP TS 36.211 "Technical Specification; Evolved Universal Terrestrial Radio Access (E-UTRA); Physical Channels and Modulation (Release 8)".

Referring to FIG. 2, a radio frame is configured of ten subframes, and one subframe is configured of two slots. For example, a length of one subframe may be 1 ms, a length of one slot may be 0.5 ms. The slot may be configured of seven symbols in a normal cyclic prefix (CP) and be configured of six symbols in an extended CP. The downlink transmission and the uplink transmission in the FDD mode are separated and divided from each other in a frequency domain.

Figure 3:
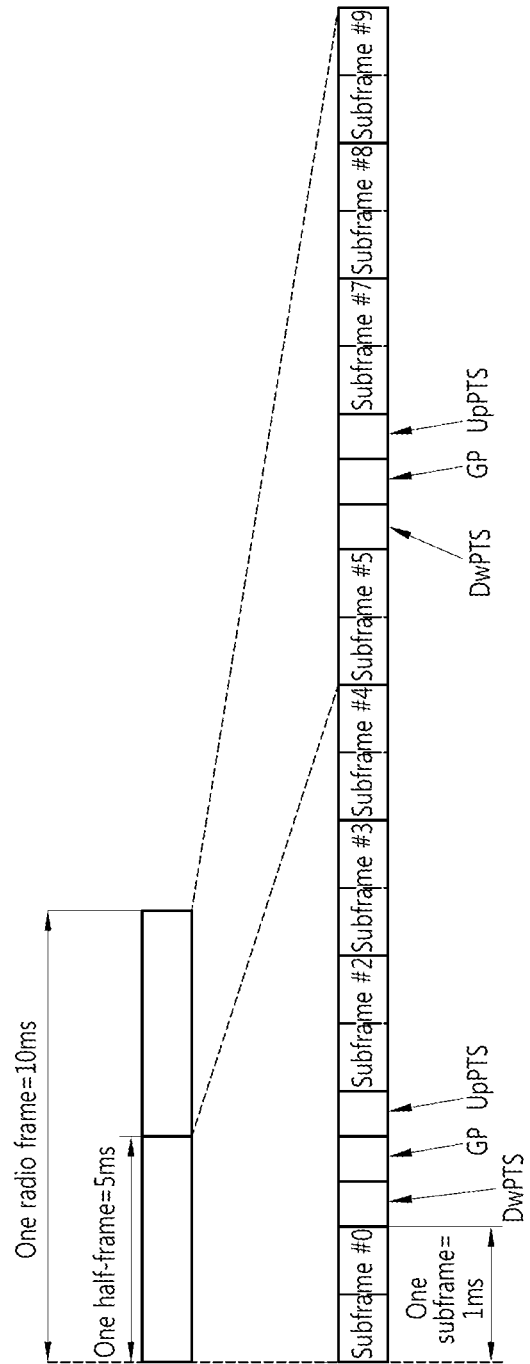
FIG. 3 shows a structure of a time division duplex (TDD) radio frame of the 3GPP LTE system.

FIG. 3 shows a structure of a TDD radio frame of the 3GPP LTE system. This may refer to section 4.2 of 3GPP TS 36.211 (V8.3.0).

Referring to FIG. 3, a radio frame is configured of two half-frames The half-frame is configured of five subframes.

An uplink and a downlink are divided from each other in subframe unit, and an uplink subframe and a downlink subframe are separated from each other by a switching point. The switching point is a region separating the uplink and the downlink from each other between the uplink subframe and the downlink subframe. The radio frame includes at least one switching point. The switching point includes a downlink pilot time slot (DwPTS), a guide period (GP), and an uplink pilot time slot (UpPTS). The DwPTS is used for initial cell search, synchronization, or channel estimation. The UpPTS is used for channel estimation in the base station and synchronization of the uplink transmission in the user equipment. The GP is a guide period for removing interference generated in the uplink due to the multipath delay of the downlink signal between the uplink and the downlink. The downlink transmission and the uplink transmission in the TDD mode are separated and divided from each other in a time domain.

The structures of the radio frames of FIGS. 2 and 3 are only examples, and the number of subframes included in the radio frames or the number of slots included in the subframes may be variously changed.

Figure 4:
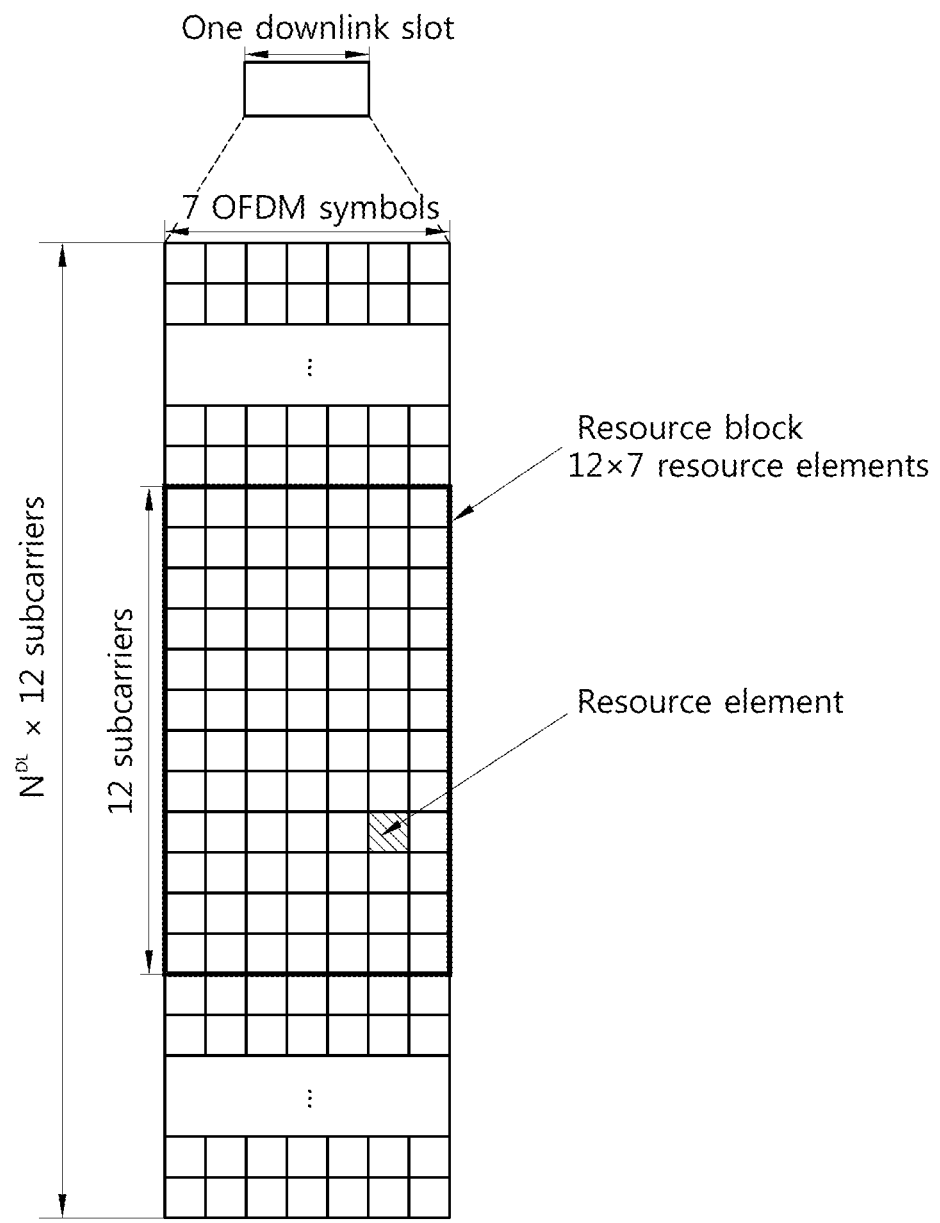
FIG. 4 is a view showing an example of a resource grid for one downlink slot.

FIG. 4 is a view showing an example of a resource grid for one downlink slot.

Referring to FIG. 4, a downlink slot includes a plurality of OFDM symbols in a time domain. FIG. 4 illustratively shows a case in which one downlink slot includes seven OFDM symbols and one resource block includes twelve sub-carriers in a frequency domain, the present invention is not limited thereto.

Each element on the resource grid is called a resource element (RE), and one resource block includes 12×7 resource elements. A resource block group is the aggregation of four resource blocks. The number ($N^{DL}$) of resource blocks included in the downlink slot is dependent on a downlink transmission bandwidth set in the cell.

Figure 5:
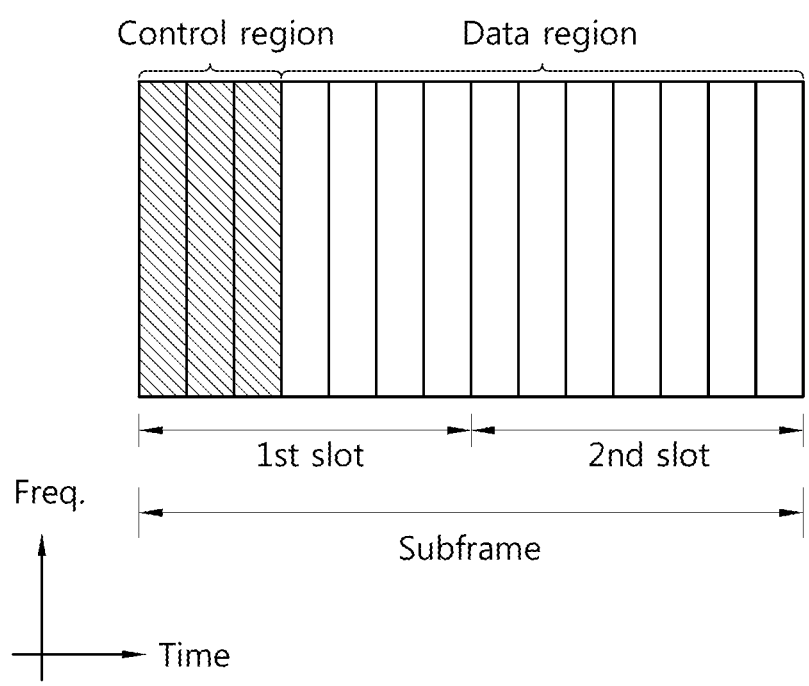
FIG. 5 shows an example of a structure of a downlink subframe.

FIG. 5 shows an example of a structure of a downlink subframe.

Referring to FIG. 5, a subframe includes two slots. Three preceding maximum OFDM symbols of a first slot within the subframe becomes a control region in which control channels are allocated, and the remaining OFDM symbols become a data region in which physical downlink shared channels (PD-SCHs) are allocated.

As downlink control channels used in the 3GPP LTE, there are a physical control format indicator channel (PCFICH), a physical downlink control channel (PDCCH), a physical hybrid-ARQ indicator channel (PHICH), or the like. The PCFICH transmitted in a first OFDM symbol of the subframe carries information on the number (that is, a size of the control region) of OFDM symbols used for transmission of the control channels within the subframe.

The control information transmitted through the PDCCH is called downlink control information (DCI). The DIC indicates uplink resource allocation information, downlink resource allocation information, uplink transmission power control command for any user equipment groups, or the like.

The PDCCH may carry resource allocation and transmission format information of a downlink shared channel (DL-SCH), resource allocation information of an uplink shared channel (UL-SCH), paging information of a PCH, system information on the DL-SCH, resource allocation information of an upper layer control message such as a random access response transmitted on the PDSCH, information on the aggregation of transmission power control commands for individual user equipments within any user equipment group, information on activation of a voice over internet protocol (VoIP), or the like. A plurality of PDCCHs may be transmitted within the control region, and the user equipment may monitor the plurality of PDCCH. The PDCCH is transmitted on one control channel element (CCE) or the aggregation of several continuous CCEs. The CCE is a logical allocation unit used for providing an encoding rate according a state of a radio channel to the PDCCH. The CCE corresponds to a plurality of resource element groups. The format of the PDCCH and the possible bit number of PDCCH are determined according to a relationship between the number of CCEs and the encoding rate provided by the CCEs.

The PHICH carries an acknowledgement (ACK)/not-acknowledgement (NACK) signal for an uplink hybrid automatic repeat request (HARQ) operation. That is, the ACK/NACK signal for the uplink data transmitted by the user equipment is transmitted on the PHICH.

Figure 6:
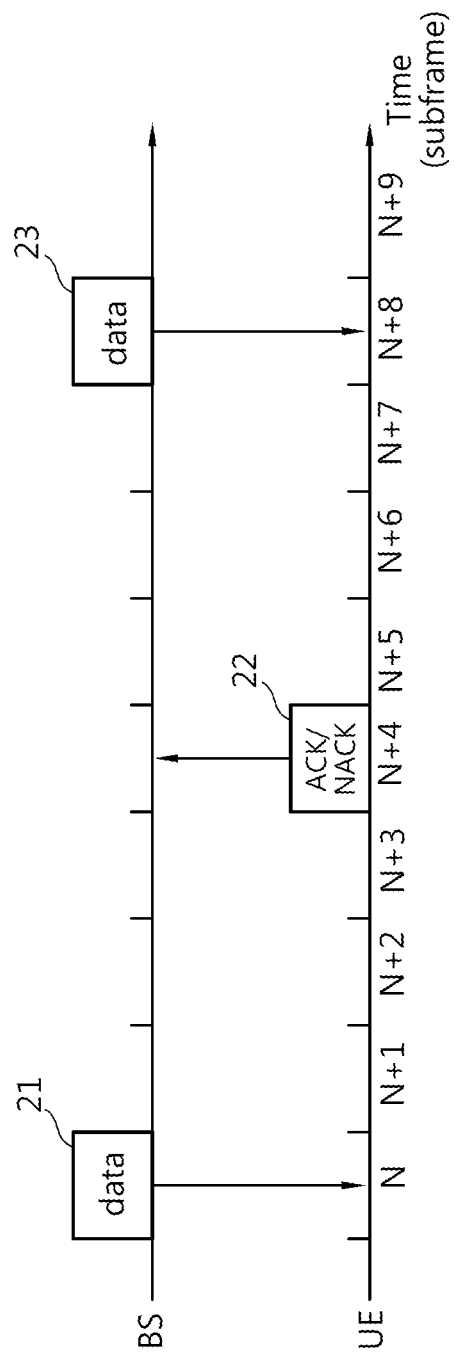
FIG. 6 shows a downlink HARQ operation between a base station and a user equipment.

FIG. 6 shows a downlink HARQ operation between a base station and a user equipment.

Referring to FIG. 6, the user equipment receiving downlink data 21 from the base station in a subframe N transmits an ACK/NACK signal 22 after a predetermined time passes, for example, in a subframe N+4. The downlink data 21 may be transmitted on a physical downlink shared channel (PDSCH) indicated by the PDCCH. The ACK/NACK signal 22 becomes an ACK signal when the downlink data is successfully decoded, and becomes a NACK signal when it is not successfully decoded. When the NACK signal is received, the base station may retransmit the downlink data 23 in a subframe N+8.

The resource allocation and the point in time of the transmission of the ACK/NACK signal for the downlink data may be dynamically informed through the signaling of the base station or may be previously promised according to the resource allocation or the point in time of the transmission of the downlink data. For example, in the FDD system, when the PDSCH is received in the subframe N, the ACK/NACK signal for the PDSCH may be previously promised to be transmitted through a physical uplink control channel (PUCCH) in the subframe N+4.

Figure 7:
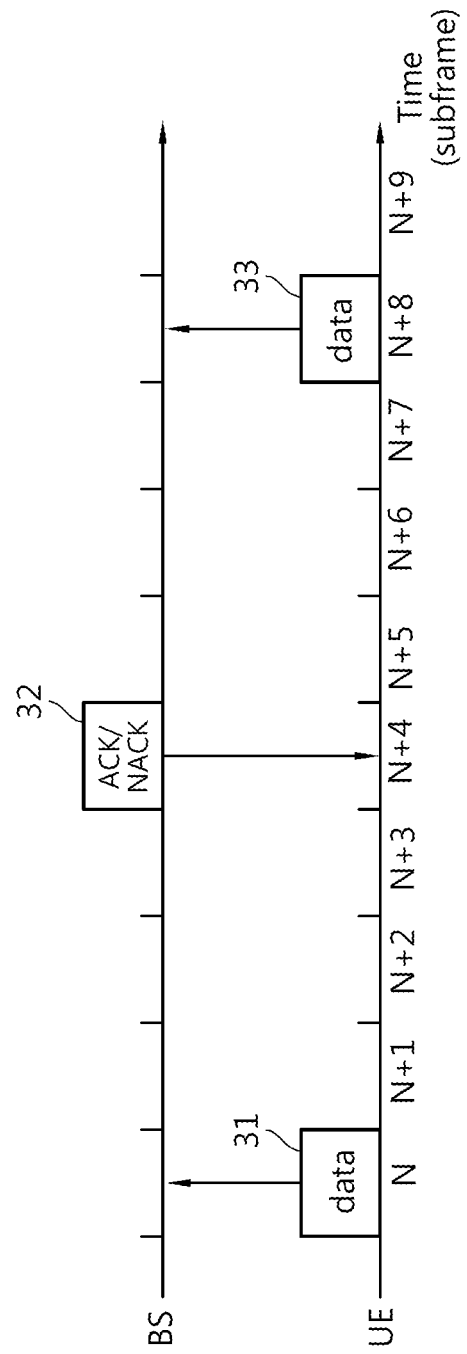
FIG. 7 shows an uplink HARQ operation between a base station and a user equipment.

FIG. 7 shows an uplink HARQ operation between a base station and a user equipment.

Referring to FIG. 7, the base station receiving uplink data 31 from the user equipment on a physical uplink shared channel (PUSCH) in a subframe N transmits an ACK/NACK signal 32 on a PHICH in a subframe N+4. The ACK/NACK signal 32 becomes an ACK signal when the uplink data 31 is successfully decoded, and becomes a NACK signal when it is not successfully decoded. When the NACK signal is received, the user equipment may transmit retransmission data 33 for the uplink data 31 until the ACK signal is received or up to the maximum retransmission number thereof The base station may transmit the ACK/NACK signal for the retransmission data 33 on a PHICH.

In the HARQ operation described with reference to FIGS. 6 and 7, a HARQ cycle is 8 ms (8TTI), and an ACK/NACK round trip time (RTT) is 4 ms. However, in the case in which the base station transmits the signal to the relay station, if the structure of the subframe and the HARQ scheme between the base station and the user equipment as described above are applied as they are, it may lead to a problem. The reason is that the relay station may have a limitation in receiving a signal from the base station in a specific subframe. The reason is that the relay station should transmit essential information such as synchronization signals (for example, a primary synchronization signal, a secondary synchronization signal, or the like), system information, or the like, to the relay user equipment in subframes having subframe indices within a radio frame corresponding to 0, 4, 5, and 9 in the case of using the FDD scheme in the radio communications system (subframes having subframe indices corresponding to 0, 1, 5, and 6 in the case of using the TDD scheme, hereinafter, these FDD/TDD subframes will be called limitation subframes), and it is difficult or impossible for the relay station to receive the signal from the base station due to self-interference caused by the transmission of the signal including the essential information.

A structure of a subframe in which a relay station receives a backhaul downlink signal from a base station will be first described.

Figure 8:
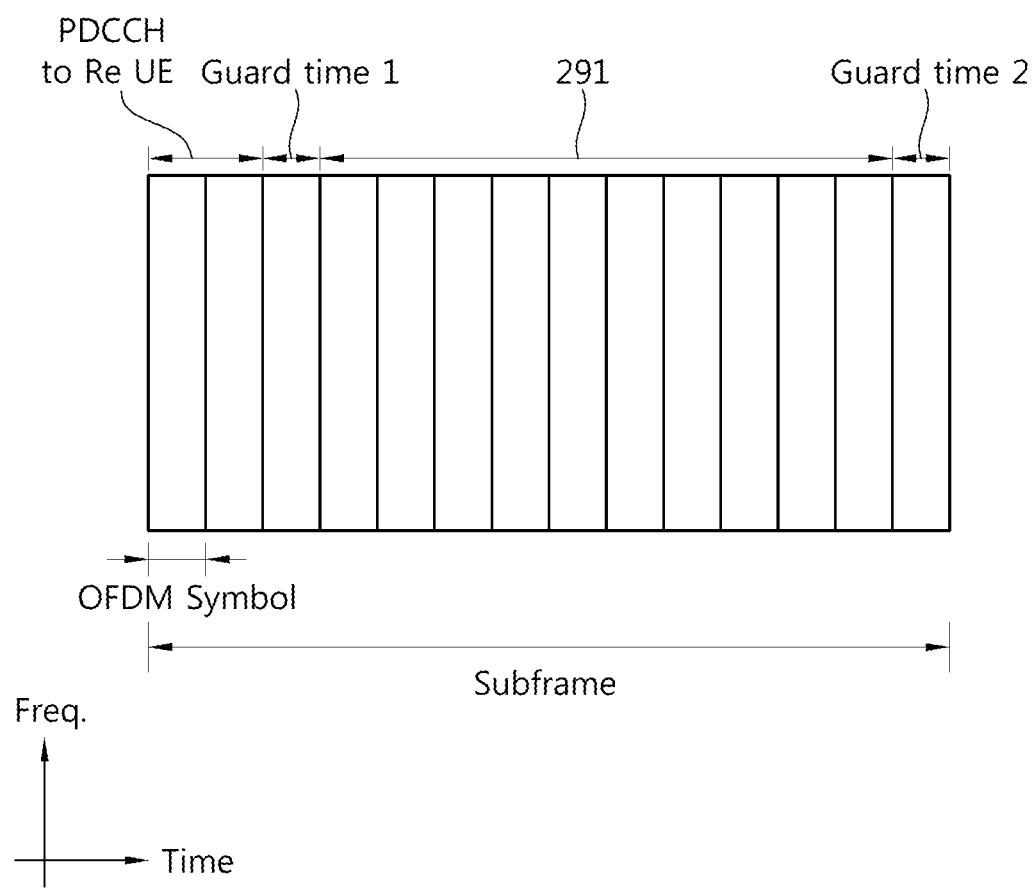
FIG. 8 shows an example of a structure of a subframe in which a relay station receives a signal from a base station.

FIG. 8 shows an example of a structure of a subframe in which a relay station receives a signal from a base station.

Referring to FIG. 8, the relay station transmits cell-specific reference signals (CRSs) according to the number of antenna ports defined through a PBCH in predetermined numbers, for example, two OFDM symbol periods within a subframe and transmits control information on a PSFICH, a PDCCH, and a PHICH, which are control channels, to the relay user equipment. This control information may serve to inform the relay user equipments that the downlink data is not transmitted, such that the user equipments do not perform unnecessary data receiving operation or reference signal measurement.

The relay station may receive a backhaul downlink signal from the base station in a subframe period 291 except for a guide period 1 and a guide period 2. The guide period 1 and the guide period 2 may not exist in some cases. That is, the guide period 1 and the guide period 2 may not be defined by the subframe timing alignment between specific backhaul and access links. For example, they may not be defined by a relationship between the number of transmission symbols of a control channel informed through a PCFICH on a downlink subframe of the base station and the number of transmission symbols of a control channel on an access downlink subframe of the relay station. The number of transmission symbols of the control channel informed through the PCFICH on the downlink subframe of the base station may be permanently or semi-statically applied; however, the number of transmission symbols of the control channel on the access downlink subframe of the relay station may be dynamically applied according to conditions of the backhaul and access downlinks. Therefore, whether or not the guide period 1 is defined may be changed.

This subframe structure, which is to provide backward compatibility with the existing LTE user equipment, utilizes a structure of a MBMS single frequency network (MBSFN) subframe and is called a fake MBSFN subframe.

As a subframe in which the relay station receives a signal from the base station, a blank subframe may also be used in addition to the above-mentioned fake MBSFN subframe. The blank subframe is a subframe in which it is not expected that the relay user equipment receives a physical signal such a reference signal from the relay station unlike the fake MBSFN subframe. The relay user equipment may be previously explicitly or implicitly informed of the blank subframe. In this case, the relay user equipment does not perform unnecessary data receiving operation or reference signal measurement with respect to the blank subframe, such that an error is not generated. Each of the fake MBSFN subframe and the blank subframe may be informed through a PCFICH of the subframe or be informed through an upper layer signal such as a radio resource control (RRC).

The relay station sets the fake MBSFN subframe or the blank subframe to the relay user equipment, whereby backhaul downlink resources within a subframe in which the relay station receives a signal from the base station are secured. Therefore, in the following description of the present invention, for convenience, an expression that applies or sets the fake MBSFN subframe or the blank subframe to the backhaul downlink will be used.

Figure 9:
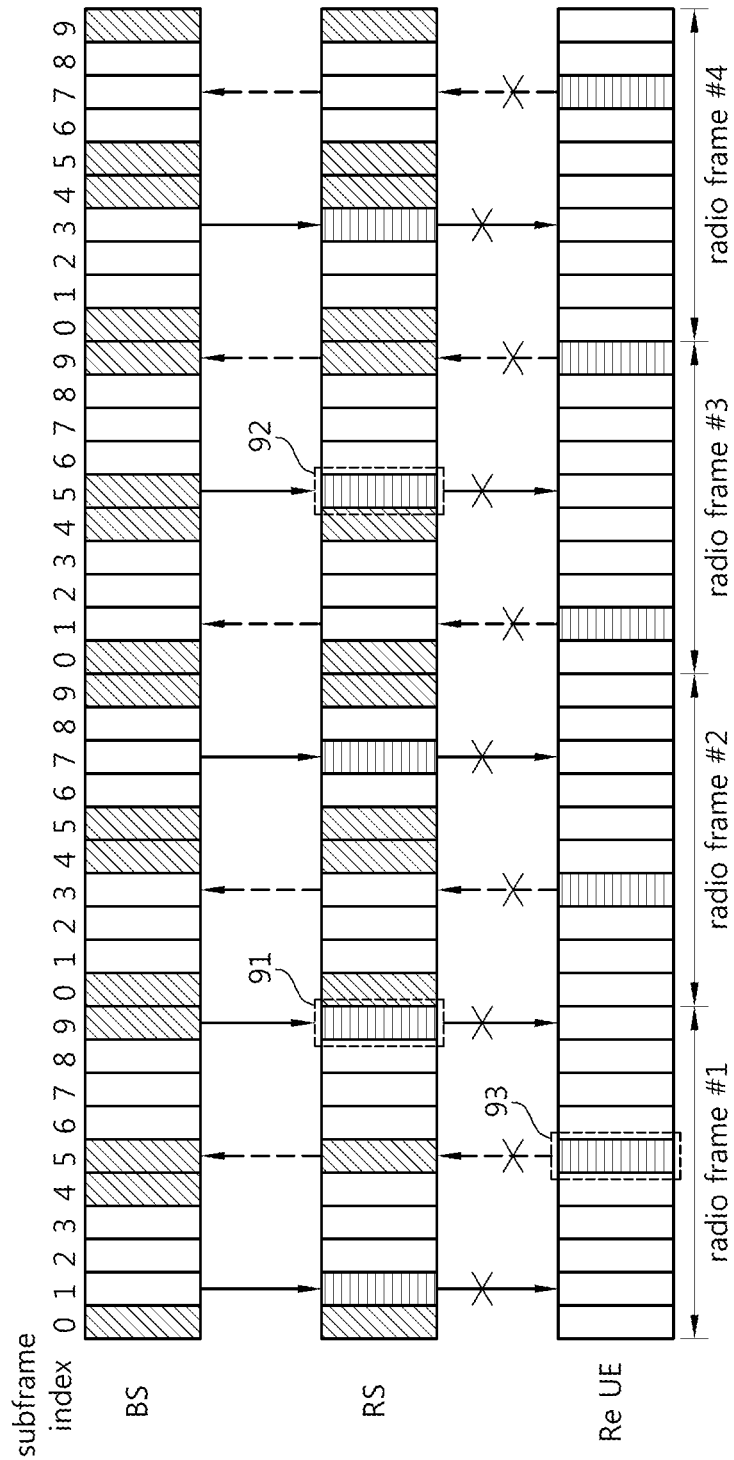
FIG. 9 shows a problem that may be generated at the time of allocation of a subframe in a backhaul link between a base station and a relay station.

FIG. 9 shows a problem that may be generated at the time of allocation of a subframe in a backhaul link between a base station and a relay station.

Referring to FIG. 9, the relay station receives downlink data in a subframe (hereinafter, represented by a subframe #1) having a subframe index 1 within a radio frame #1. When a HARQ period is 8 ms and an ACK/NACK RTT is 4 ms, the relay station transmits an ACK/NACK signal after four subframe intervals and receives transmitted or retransmitted downlink data after eight subframe intervals. In this case, the relay station receives the downlink data from the base station in a subframe #9 91 within the radio frame #1. Likewise, the relay station receives the downlink data from the base station in a subframe #5 92 within the radio frame #3. Hereinafter, a subframe corresponding to a limitation subframe among the subframes in which the relay station receives the signal from the base station (or the subframes in which the base station transmits the signal to the relay station) will be called a collision subframe for convenience. In the above-mentioned example, the subframe #9 91 within the radio frame #1 and the subframe #5 92 within the radio frame #3 are the collision subframes. Further, a synchronous HARQ operation having a HARQ cycle of 8 ms was strictly applied in the above-mentioned example. When an asynchronous HARQ operation in which resource allocation for a retransmitted channel is based on a PDCCH is applied to a downlink, an interval of a retransmission subframe may be changed. Here, the retransmission subframe should not be the limitation subframe. In the case in which the backhaul downlink subframe such as the subframe #1 within the radio frame #1 is the fake MBSFN subframe in the above-mentioned example, the relay station may transmit a reference signal and a control signal to the relay user equipment during initial predetermined numbers of OFDM symbols. It may be expressed that partial blanking is generated in this regard. On the other hand, in the case of a subframe #5 93 within the radio frame #1 in the access link, the relay user equipment may not transmit a signal to the relay station. Therefore, it may be expressed that total blanking is generated (the subframe 93 in which the total blanking is generated from a viewpoint of the relay user equipment is represented by a horizontal stripe in FIG. 9. Hereinafter, it will be applied to the following drawings).

Even though a position of an initial subframe in which a base station transmits a signal to a relay station in predetermined numbers of radio frame periods is moved, the generation of collision subframes may not be prevented.

Figure 10:
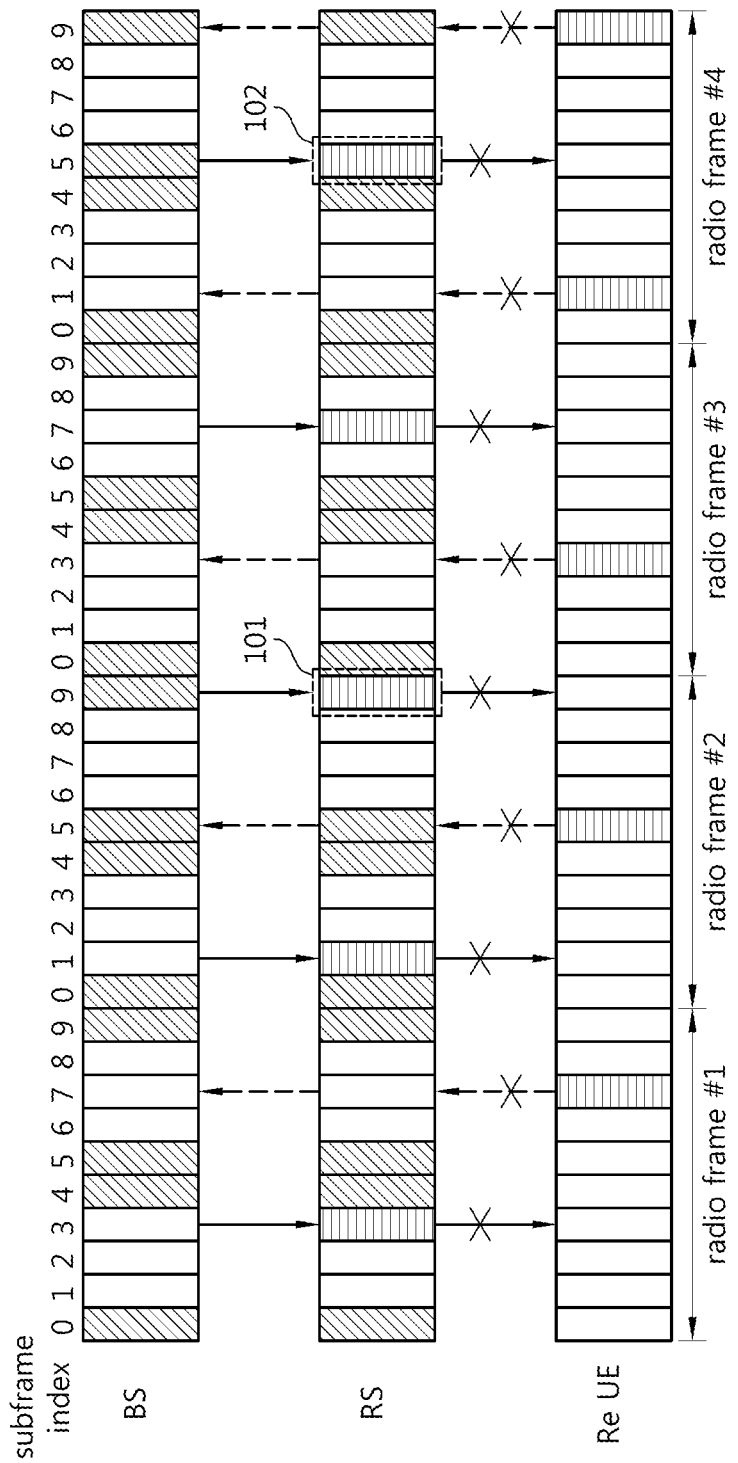
FIG. 10 shows an example where a position of an initial subframe in which a base station transmits a signal to a relay station in four radio frame periods is moved.

FIG. 10 shows an example where a position of an initial subframe in which a base station transmits a signal to a relay station in four radio frame sections is moved.

FIG. 10 is different from FIG. 9 in which an initial subframe in which the base station transmits a signal to the relay station is a subframe #3 within the radio frame #1. Even though the position of the initial subframe is moved as described above, collision subframes are generated in a subframe #9 101 within a radio frame #2 and a subframe #5 102 within a radio frame #4.

A method for allocating subframes in a radio communications system that prevents collision subframes from being generated will be described.

The base station selects a backhaul downlink subframe in which it is to transmit a signal to the relay station and punctures the selected backhaul downlink subframe when it is a collision subframe corresponding to a limitation subframe. The punctured subframe may be used in the access link. In this case, the backhaul downlink signal that should be retransmitted in the collision subframe is transmitted in a backhaul downlink subframe in which the transmission may be subsequently performed, such that a HARQ cycle may becomes an interval increased from an interval of eight subframes, for example, an interval of sixteen subframes. In other words, the backhaul downlink signal retransmission basically having a 8 ms HARQ cycle may have a 8 ms HARQ cycle or an Xms HARQ cycle according to whether or not the retransmission backhaul downlink subframe is punctured. Here, the Xms HARQ cycle may be, for example, a 16 ms HARQ cycle. In the case in which a PHICH transmission downlink backhaul subframe for backhaul physical uplink shared channel (PUSCH) transmission is punctured, the backhaul downlink signal is transmitted in a backhaul downlink subframe in which the transmission may be subsequently performed, such that a 8 ms HARQ cycle as well as an increased HARQ cycle, for example, a 16 ms HARQ cycle may be generated also in a backhaul uplink. Here, a downlink ACK/NACK RTT for the uplink data channel transmission may be a RTT increased from an interval of four subframes, for example, an interval of twelve subframes, rather than an interval of four subframes.

Figure 11:
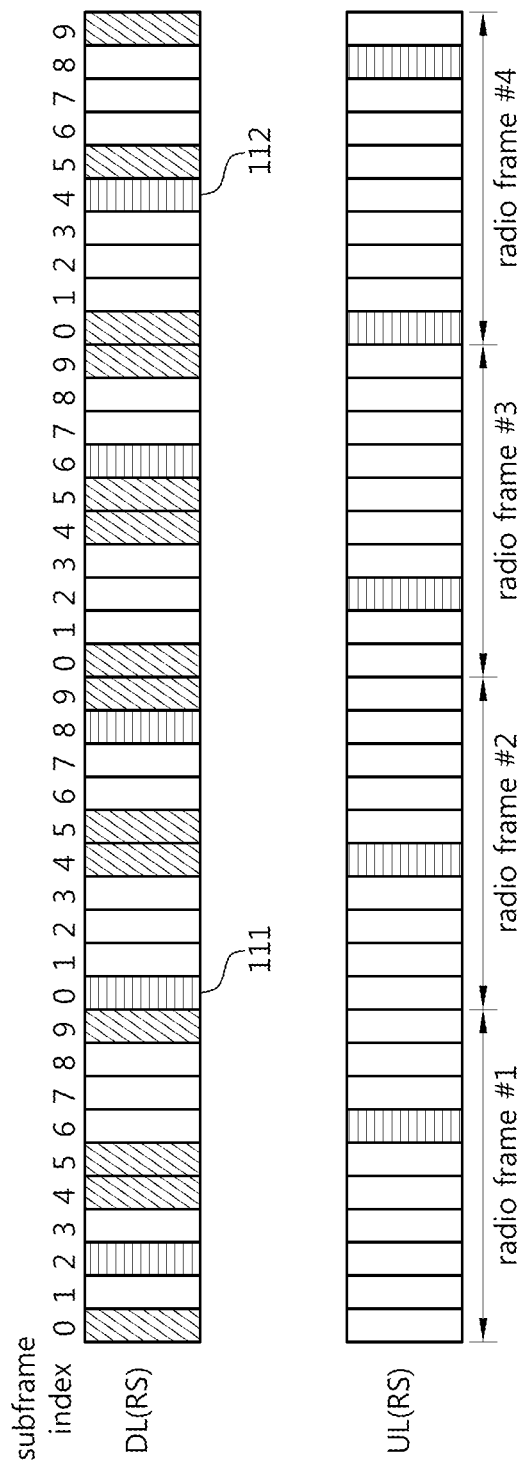
FIG. 11 shows an example of puncturing a backhaul downlink subframe.

FIG. 11 shows an example of puncturing a backhaul downlink subframe.

Referring to FIG. 11, a subframe #0 111 within a radio frame #2 and a subframe #4 112 within a radio frame #4 among the backhaul downlink subframes correspond to the collision subframes. The base station may puncture these collision subframes and allocate them to the access link. This method has an advantage in the case in which the backhaul link has asymmetrical channel quality. For example, in the case in which the channel quality of the backhaul downlink is significantly better than that of the backhaul uplink, the backhaul uplink subframe is not punctured, such that more subframes may be used.

In addition, in the case in which there are the punctured subframes among the backhaul downlink subframes, a plurality of backhaul uplink subframes may be combined as one transmission unit. For example, an ACK/NACK transmitted in non-punctured backhaul downlink subframes may be defined as a response to a codeword transmitted in the plurality of backhaul uplink subframes. The ACK/NACK that is to be transmitted in the punctured backhaul downlink subframes is transmitted in other non-punctured backhaul downlink subframes In the case in which single input multiple output (SIMO)/single input single output (SISO) is used in the backhaul link, the ACK/NACK for one codeword transmitted in two backhaul uplink subframes may be transmitted in one backhaul downlink subframe. Alternatively, in the case in which multiple input multiple output (MIMO) is used in the backhaul link, a plurality of codewords may be transmitted in two backhaul uplink subframes and the ACKs/NACKs for the plurality of codewords may be transmitted in the non-punctured backhaul downlink subframe.

Alternatively, in the case in which a plurality of codewords are transmitted in one backhaul uplink subframe and the backhaul uplink subframe is provided in plural, ACKs/NACKs for each codeword may be transmitted in the same backhaul downlink subframe.

The punctured backhaul downlink subframe may be used in the access link. Broadcast information such as, for example, system information that does not require the ACK/NACK may be transmitted in the punctured backhaul downlink subframe. In the case in which the punctured backhaul downlink subframe is used in the access link of an LTE-A system, an ACK/NACK RTT or a HARQ cycle may be newly defined. Describing in more detail, the backhaul downlink signal that should be retransmitted in the collision subframe is transmitted in a backhaul downlink subframe in which the transmission may be subsequently performed, such that a HARQ cycle may become an interval increased from an interval of eight subframes, for example, an interval of sixteen subframes. In other words, the backhaul downlink signal retransmission basically having a 8 ms HARQ cycle may have a 8 ms HARQ cycle or an Xms HARQ cycle (X indicates a positive integer) according to whether or not the retransmission backhaul downlink subframe is punctured. Here, the Xms HARQ cycle may be, for example, a 16 ms HARQ cycle. In the case in which a PHICH transmission downlink backhaul subframe for backhaul physical uplink shared channel (PUSCH) transmission is punctured, the backhaul downlink signal is transmitted in a backhaul downlink subframe in which the transmission may be subsequently performed, such that a 8 ms HARQ cycle as well as an increased HARQ cycle, for example, a 16 ms HARQ cycle may be generated also in a backhaul uplink. Here, a downlink ACK/NACK RTT for the uplink data channel transmission may be a RTT increased from an interval of four subframes, for example, an interval of twelve subframes, rather than an interval of four subframes.

Figure 12:
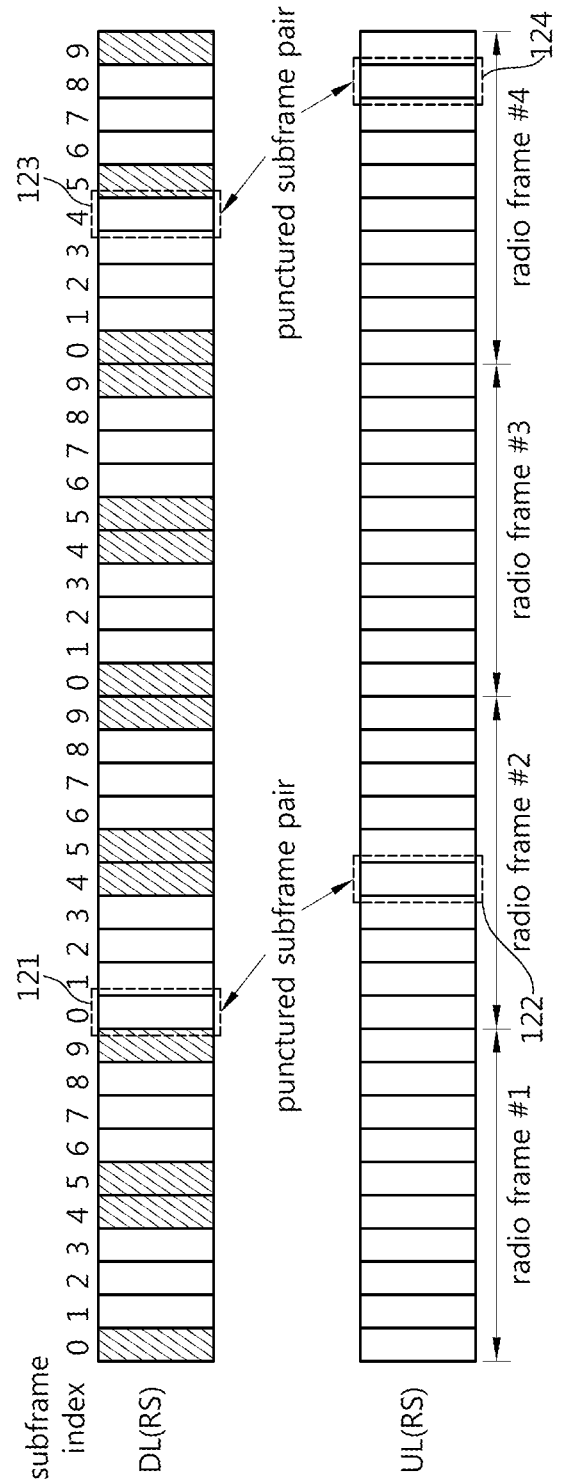
FIG. 12 shows another example of puncturing a backhaul downlink subframe.

FIG. 12 shows another example of puncturing a backhaul downlink subframe.

Unlike FIG. 11, in FIG. 12, a backhaul downlink subframe and a backhaul uplink subframe are punctured in pair. In this case, the backhaul downlink subframe is a collision subframe, and the backhaul uplink subframe is a subframe that is HARQ phase-connected with the backhaul downlink subframe. That is, the backhaul uplink subframe is a subframe that is spaced apart temporally forwardly or backwardly from the backhaul downlink subframe by a half of the HARQ cycle or the ACK/NACK RTT. An example where the backhaul uplink subframe is spaced apart from the backhaul downlink subframe by an interval of four subframes is shown in FIG. 12. In the case in which the pair of punctured subframes is used in the access link of an LTE-A system, an ACK/NACK RTT or a HARQ cycle may be newly defined. For example, the ACK/NACK RTT or the HARQ cycle may be defined as described above with reference to FIG. 11.

In the case in which the backhaul downlink subframe selected for transmitting a signal to the relay station corresponds to the limitation subframe, the base station may allocate the backhaul downlink subframe to another subframe, that is, a substitution subframe, which is not the limitation subframe. The base station may apply this method, for example, when it performs the HARQ operation with the relay station.

The substitution subframe may be an initially positioned subframe among subframes positioned after the limitation subframe to which the backhaul downlink subframe corresponds, that is, the collision subframe, as an example. In other words, the base station moves the backhaul downlink subframe corresponding to the limitation subframe to the next subframe, which is not the limitation subframe.

Figure 13:
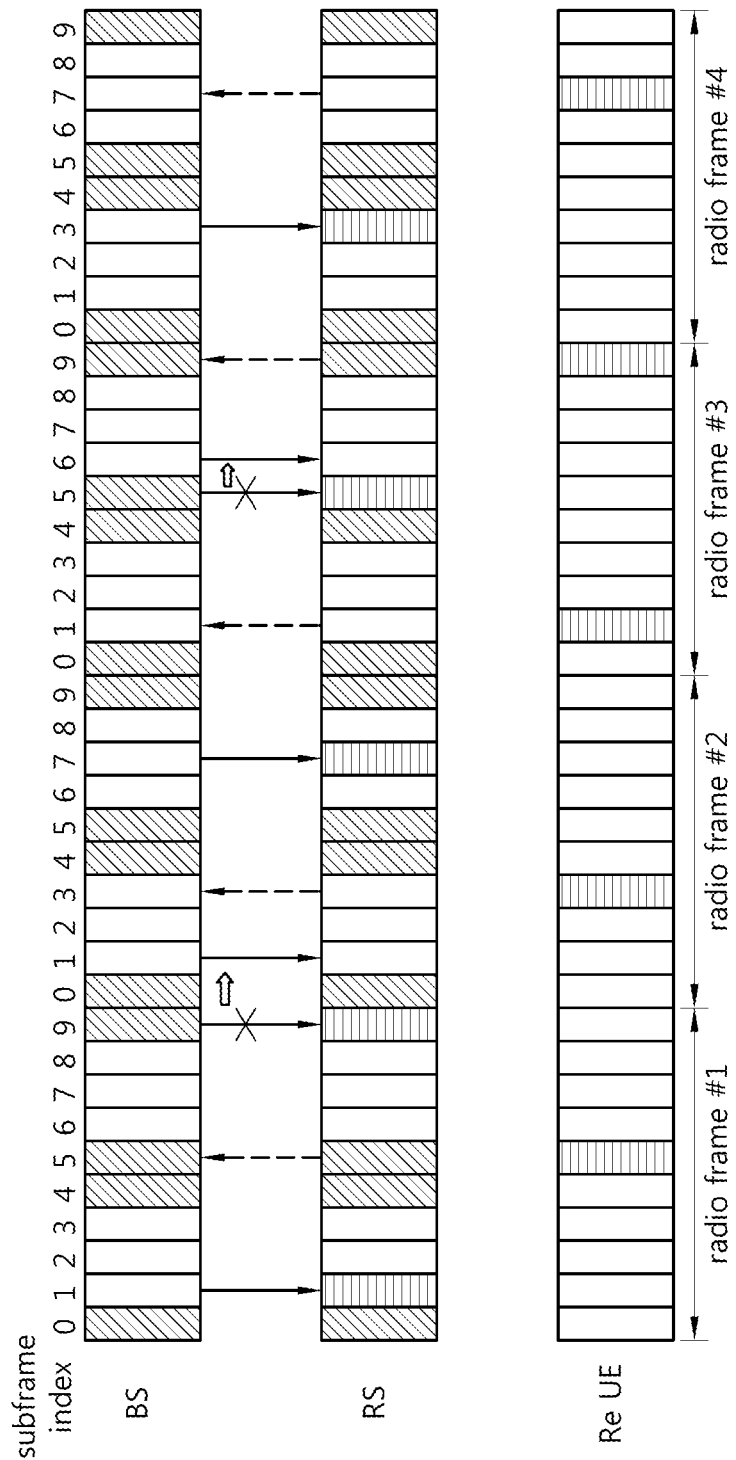
FIG. 13 shows an example of moving a backhaul downlink subframe corresponding to a limitation subframe to the next subframe, which is not the limitation subframe, in a radio communications system operating in a FDD scheme.

FIG. 13 shows an example of moving a backhaul downlink subframe corresponding to a limitation subframe to the next subframe, which is not the limitation subframe, in a radio communications system operating in a FDD scheme.

Referring to FIG. 13, since a subframe #9 within a radio frame #1 corresponds to a collision subframe, it is moved to a subframe #1 within a radio frame #2, which is a substitution subframe. Likewise, a subframe #5 within a radio frame #3 is moved to a subframe #6 within a radio frame #3, which is a substitution subframe. Here, backhaul physical downlink shared channels (PDSCHs) and control channels may be transmitted and related physical signals may be transmitted, in the moved subframe. The base station may transmit the channels except for the PDSCH and the physical signal in the substitution subframe through a transmission scheme different from the above-mentioned transmission scheme. For example, the base station may transmit only a downlink ACK/NACK. Five backhaul downlink subframes within four radio frames are allocated, and the PDSCH is not transmitted in two backhaul downlink subframes of the five backhaul downlink subframes, such that a throughput loss of 40% is generated. However, an uplink HARQ cycle between the base station and relay station may be maintained at 8 ms, such that additional signaling burden may be reduced.

The substitution subframe may be a last positioned subframe among subframes positioned before the limitation subframe to which the backhaul downlink subframe corresponds, as another example. In other words, the base station moves the backhaul downlink subframe corresponding to the limitation subframe to the previous subframe, which is not the limitation subframe.

Figure 14:
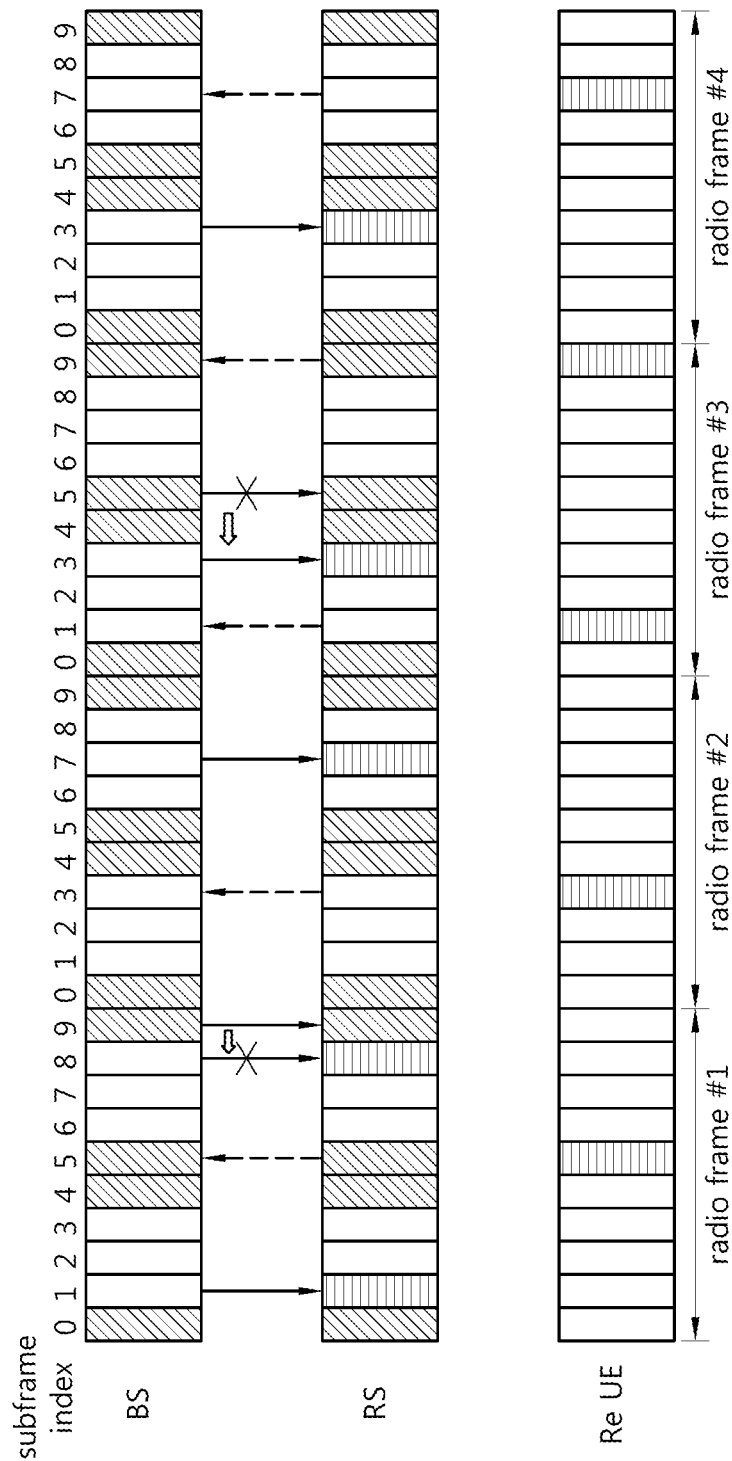
FIG. 14 shows an example of moving a backhaul downlink subframe corresponding to a limitation subframe to the previous subframe, which is not the limitation subframe, in a radio communications system operating in a FDD scheme.

FIG. 14 shows an example of moving a backhaul downlink subframe corresponding to a limitation subframe to the previous subframe, which is not the limitation subframe, in a radio communications system operating in a FDD scheme.

Referring to FIG. 14, since a subframe #9 within a radio frame #1 corresponds to a collision subframe, it is moved to a subframe #8 within a radio frame #1, which is a substitution subframe. Likewise, a subframe #5 within a radio frame #3 is moved to a subframe #3 within a radio frame #3, which is a substitution subframe. Here, backhaul physical downlink shared channels, physical control channels, and physical signals may be basically transmitted. However, as another method, the reply station may transmit the channels except for the PDSCH and the physical signal in a subframe connected so that it receives a downlink ACK/NACK with respect to the substitution subframes, that is, a subframe #5 within a radio frame #1 or a subframe #1 of a radio frame #3 (for example, the relay station may transmit only an uplink ACK/NACK). In this method, the throughput loss of 40% is generated only in the transmission from the relay station to the base station.

The substitution subframe may be a subframe temporally closest to the limitation subframe to which the backhaul downlink subframe corresponds, as another example. In other words, the base station moves the backhaul downlink subframe corresponding to the limitation subframe to the subframe, which is not the limitation subframe but closest to the limitation subframe.

Figure 15:
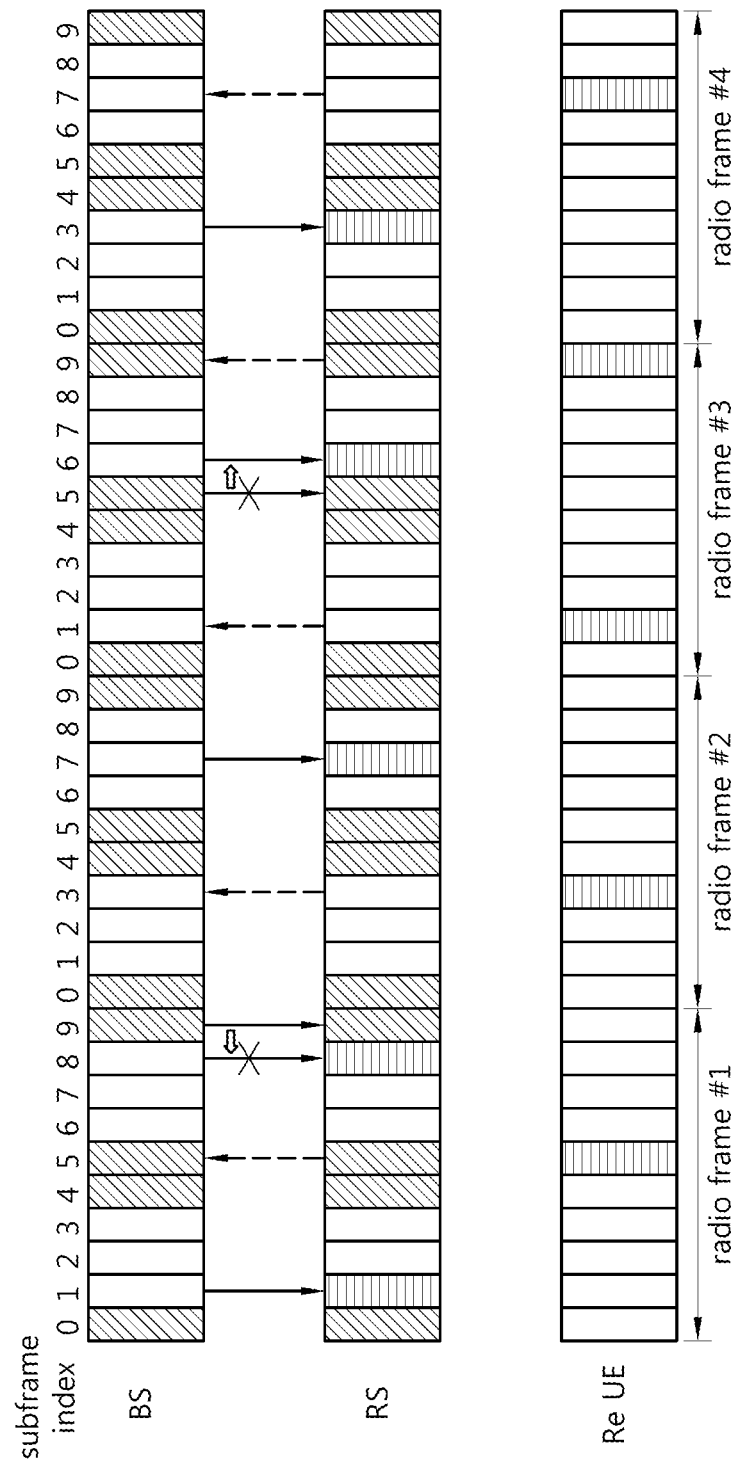
FIG. 15 shows an example of moving a backhaul downlink subframe corresponding to a limitation subframe to a subframe which is not the limitation subframe but closest to the limitation subframe, in a radio communications system operating in a FDD scheme.

FIG. 15 shows an example of moving a backhaul downlink subframe corresponding to a limitation subframe to a subframe, which is not the limitation subframe but closest to the limitation subframe, in a radio communications system operating in a FDD scheme.

Referring to FIG. 15, since a subframe #9 within a radio frame #1 corresponds to a collision subframe, it is moved to a subframe #8 within a radio frame #1, which is a substitution subframe. A subframe #5 within a radio frame #3 is moved to a subframe #6 within a radio frame #3, which is a substitution subframe. That is, the substitution subframe is variably positioned before or after the collision subframe. Here, backhaul physical downlink shared channels, physical control channels, and physical signals may be basically transmitted. However, as another method, the reply station may transmit the channels except for the PUSCH and the physical signal in a subframe connected so that it receives a downlink ACK/NACK with respect to the substitution subframe, that is, a subframe #5 within a radio frame #1 (for example, the relay station may transmit only an uplink ACK/NACK). In addition, the base station may transmit the channels except for the PDSCH and the physical signal in the subframe #6 within the radio frame #3, which is the substitution subframe. In this method, the throughput loss of 20% is generated in each of the transmission from the relay station to the base station and the transmission from the base station to the relay station.

Exemplary embodiments in which when the backhaul downlink subframe corresponds to the limitation subframe, it is moved to a subframe, which is not the limitation subframe, have been described. These exemplary embodiments may be performed by controlling a time relationship to be described below.

Figure 16:
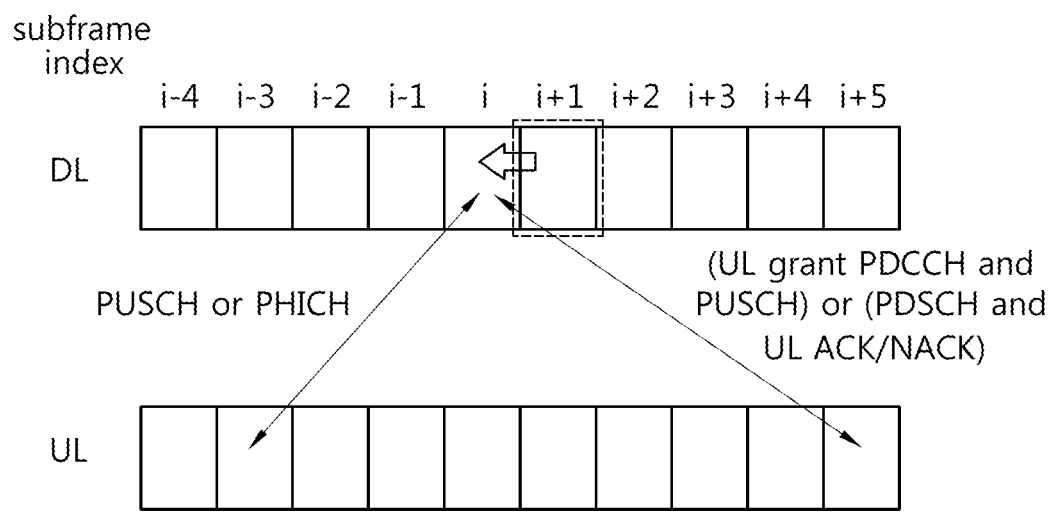
FIG. 16 shows a time relationship controlled in the case in which a backhaul downlink subframe is moved to a non-limitation subframe last positioned among subframes positioned before the limitation subframes.

FIG. 16 shows a time relationship controlled in the case in which a backhaul downlink subframe is moved to a last positioned non-limitation subframe among subframes positioned before the limitation subframes.

A time relationship between a PUSCH and a PHICH is controlled by the base station in a relationship between a subframe #(i−3) and a subframe #i. In addition, a relationship between an uplink grant PDCCH (an UL grant PDCCH) and a PUSCH or a time relationship between a PDSCH and an uplink ACK/NACK may be controlled by the base station in a relationship between the subframe #i and a subframe #(i+5). A detailed description thereof will be provided below.

Figure 17:
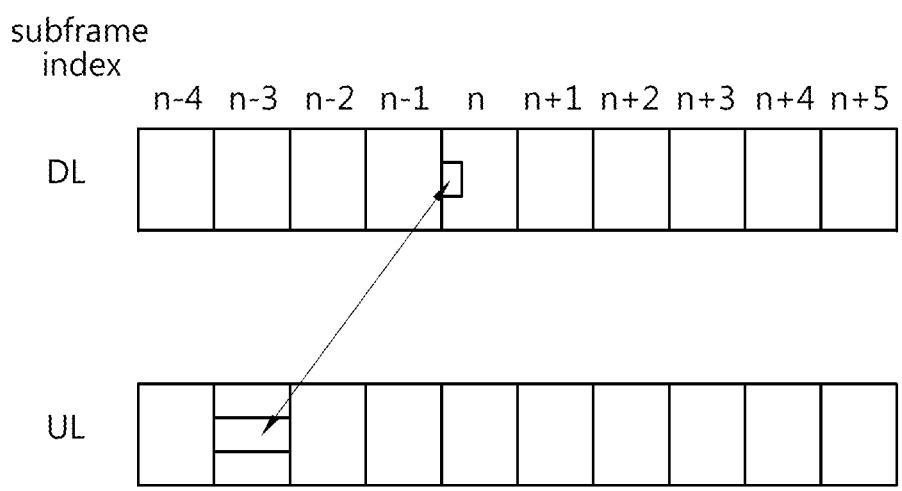
FIG. 17 shows a time relationship controlled between a physical uplink shared channel (PUSCH) and a physical HARQ indicator channel (PHICH).

FIG. 17 shows a time relationship controlled between a physical uplink shared channel (PUSCH) and a physical HARQ indicator channel (PHICH).

When the relay station transmits data to the base station through the PUSCH in the subframe #(n−3), the base station transmits an ACK/NACK to the relay station through the PHICH in the subframe #n. In other words, the transmission of the base station through the PHICH in the subframe #n is to perform the ACK/NACK for the data transmitted by the relay station through the PUSCH in the subframe #(n−3). This may also be expressed as an ACK/NACK RTT being set to 3 ms in an uplink HARQ operation.

Figure 18:
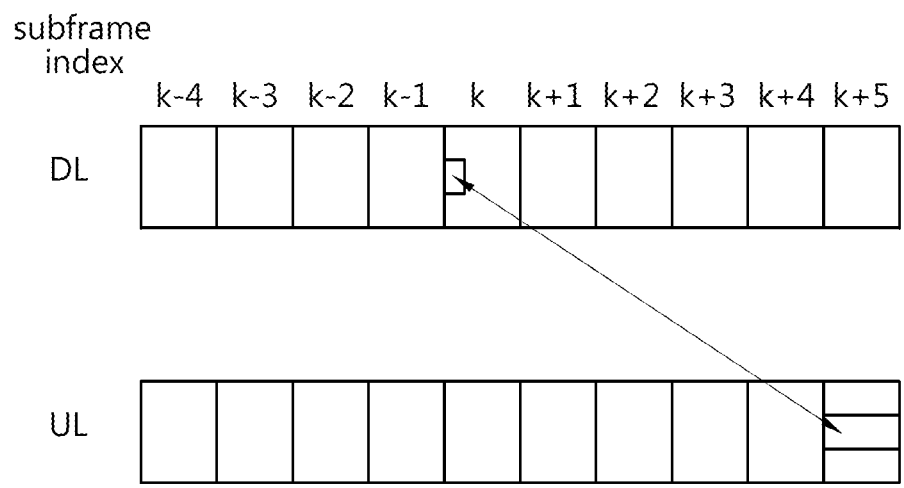
FIG. 18 shows a time relationship controlled between an uplink grant physical downlink control channel (an UL grant PDCCH) and a PUSCH.

FIG. 18 shows a time relationship controlled between an uplink grant PDCCH (an UL grant PDCCH) and a PUSCH.

The base station allows the relay station to transmit the PUSCH to the base station in the subframe #(k+5) through the uplink grant PDCCH transmitted in the subframe #k. In this case, the uplink grant transmitted in the subframe #k may be set as a grant message for the PUSCH transmission in a plurality of subframes. In that case, the uplink grant may also serve as a grant message for the PUSCH transmitted in the subframe #(k+5) and subsequently set numbers of subframes.

Figure 19:
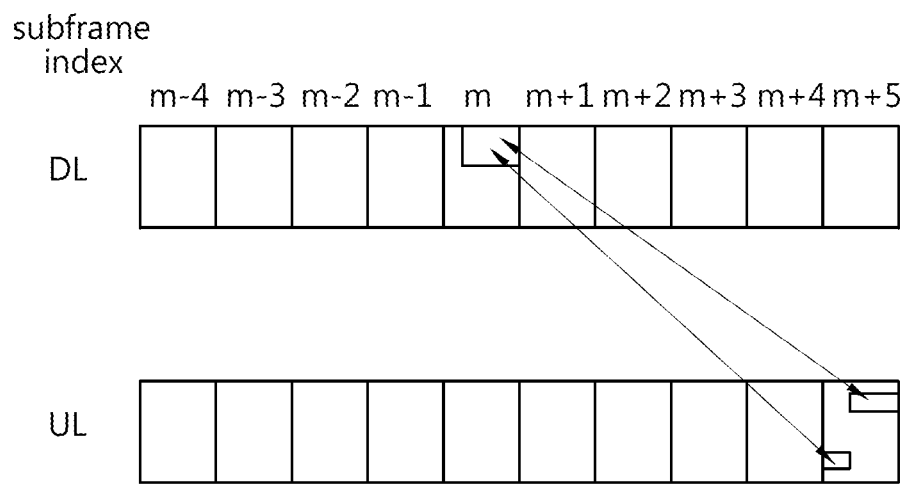
FIG. 19 shows a time relationship controlled between a physical downlink shared channel (PDSCH) and an uplink ACK/NACK.

FIG. 19 shows a time relationship controlled between a PDSCH and an uplink ACK/NACK.

When the base station transmits a PDSCH to the relay station in a subframe #m, the relay station transmits an uplink ACK/NACK to the base station in a subframe #(m+5). This may also be expressed as an ACK/NACK RTT being set to 5 ms in a downlink HARQ operation.

Figure 20:
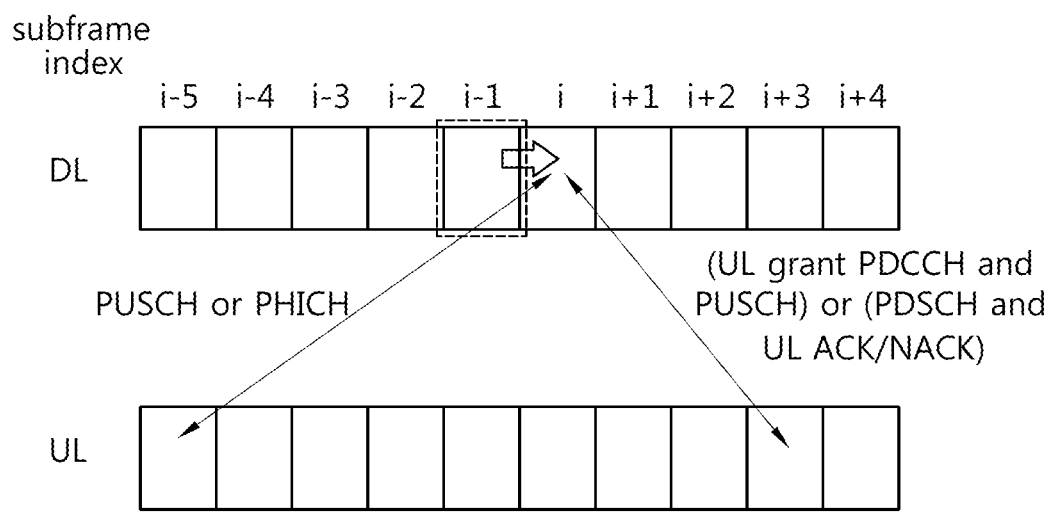
FIG. 20 shows a time relationship controlled in the case in which a backhaul downlink subframe is moved to an initially positioned non-limitation subframe among subframes positioned after the limitation subframes.

FIG. 20 shows a time relationship controlled in the case in which a backhaul downlink subframe is moved to an initially positioned non-limitation subframe among subframes positioned after the limitation subframes.

A time relationship between a PUSCH and a PHICH is controlled by the base station in a relationship between a subframe #(i−5) and a subframe #i. In addition, a relationship between an uplink grant PDCCH (an UL grant PDCCH) and a PUSCH or a time relationship between a PDSCH and an uplink ACK/NACK may be controlled by the base station in a relationship between the subframe #i and a subframe #(i+3).

In the case shown in FIG. 20, the time relationship between the PUSCH and the PHICH, the relationship between the uplink grant PDCCH (the UL grant PDCCH) and the PUSCH, or the time relationship between the PDSCH and the uplink ACK/NACK may also be controlled, as described in FIGS. 17 to 19.

When the relay station transmits data to the base station through the PUSCH in the subframe #(i−5), the base station transmits an ACK/NACK to the relay station through the PHICH in the subframe #i. In other words, the transmission of the base station through the PHICH in the subframe #i is to perform the ACK/NACK for the data transmitted by the relay station through the PUSCH in the subframe #(i−5). This may also be expressed as an ACK/NACK RTT being set to 5 ms in an uplink HARQ operation.

The base station allows the relay station to transmit the PUSCH to the base station in the subframe #(k+3) through the uplink grant PDCCH transmitted in the subframe #i. In this case, the uplink grant transmitted in the subframe #i may be set as a grant message for the PUSCH transmission in a plurality of subframes. In that case, the uplink grant may also serve as a grant message for the PUSCH transmitted in the subframe #(i+3) and subsequently set numbers of subframes.

When the base station transmits a PDSCH to the relay station in a subframe #i, the relay station transmits an uplink ACK/NACK to the base station in a subframe #(i+3). This may also be expressed as an ACK/NACK RTT being set to 3 ms in a downlink HARQ operation.

The exemplary embodiments according to the present invention may also be expressed as the case in which the relay station uses a synchronous HARQ operation and moves or shift the subframe connected so that the relay station receives a downlink ACK/NACK with respect to the subframe in which the PUSCH is transmitted to a non-limitation subframe when the subframe corresponds to the limitation subframe.

The exemplary embodiments according to the present invention may also be expressed as the case in which the base station uses the synchronous HARQ operation and the subframe connected so that the base station receives the uplink ACK/NACK with respect to the subframe in which the PDSCH is transmitted has another ACK/NACK RTT, which is not a 4 ms ACK/NACK RTT.

The exemplary embodiments of the present invention may also be performed by allowing the base station to transmit offset values for a basically set HARQ cycle and ACK/NACK RTT value to the relay station. For example, in the case in which the basically set ACK/NACK RTT value is 4 ms (4TTI), when the base station moves the backhaul downlink subframe corresponding to the limitation subframe forwardly or backwardly in a time domain, an offset value may be provided by an interval of subframes that are to be moved. For example, when the base station moves the backhaul downlink subframe forwardly by one subframe, an offset value of −1 may be provided, when the base station moves the backhaul downlink subframe backwardly by one subframe, an offset value of +1 may be provided, when the base station moves the backhaul downlink subframe forwardly by two subframes, an offset value of −2 may be provided, and when the base station moves the backhaul downlink subframe backwardly by two subframes, an offset value of +2 may be provided.

In addition, the method described with reference to FIGS. 11 and 12 and the method described with reference to FIGS. 13 to 15 in the exemplary embodiments according to the present invention may also be used in combination. For example, in FIGS. 13 and 14, when the backhaul downlink subframe corresponding to the limitation subframe is spaced apart from the substitution subframe by an interval of one subframe, the backhaul downlink subframe is moved; however, when the backhaul downlink subframe is spaced apart from the substitution subframe by an interval of two subframes, a method for puncturing the backhaul downlink subframe without moving it may also be used.

Although the above-mentioned exemplary embodiments have described the case in which the HARQ cycle is 8 ms and the ACK/NACK RTT is 4 ms (the HARQ cycle is 16 ms in transmission having a rank of 2 or more in an MIMO of transmitting a plurality of codewords), the present invention may also be applied to the case in which the HARQ cycle is 10 ms and the ACK/NACK RTT is 4 ms or 5 ms.

The exemplary embodiments of the present invention may effectively prevent the collision subframe from being generated in allocating the subframe in the backhaul link between the base station and the relay station. In addition, supporting the HARQ operation having backward compatibility in the access link between the relay station and the relay user equipment (for example, an LTE user equipment) may also be considered in the exemplary embodiments of the present invention. In this case, it is assumed that the relay station or the base station includes a scheduler performing a scheduling function for the access link.

The scheduler may limit the PDSCH transmission in the access downlink subframe connected so that the ACK/NACK is transmitted with respect to the access uplink subframe in which the total blanking is generated. Alternatively, the scheduler may allow the PDSCH to be transmitted in the access downlink subframe HARQ phase-connected with the access uplink subframe, limit the transmission of the ACK/NACK in the access uplink subframe in which the total blanking is generated, and allow the relay user equipment to transmit the ACK/NACK in the access uplink subframe in which the transmission may be subsequently performed. Alternatively, the ACK/NACK transmitted by the relay user equipment in the access uplink subframe may be defined as the ACK/NACK for the PDSCH transmitted by the relay station in a plurality of access downlink subframes. In that case, the relay user equipment may transmit the ACK/NACK for the previous PDSCH transmission by using an access uplink subframe, which is not the access uplink subframe in which the total blanking is generated.

In applying the exemplary embodiments described with reference to FIGS. 13 to 20, a situation in which a time from the reception of the PDSCH or the PUSCH to the transmission of the ACK/NACK or a time from the reception of the ACK/NACK to the transmission of new data or retransmission data to the PDSCH or the PUSCH is short from a viewpoint of the base station or the user equipment may be generated. In a period in which the ACK/NACK RTT or the time from the reception of the ACK/NACK to the transmission of the physical data channel is short as described above, methods that do not schedule the PDSCH or the PUSCH may be applied or methods that apply an asymmetrical HARQ scheme to the uplink and transmit the uplink grant PDCCH for the retransmission may be considered.

Other methods for minimizing the generation of the collision subframe will be described below.

As one exemplary embodiment, there is a method of changing the HARQ cycle applied in the downlink and/or the uplink from the interval of the eight subframes, that is, 8 ms, to the interval of ten subframes, that is, 10 ms in order to perform evolved MIMO transmission, or the like, in the backhaul link or the link between the base station and the user equipment. Here, in order to avoid the setting overlapped with the subframes having the subframe indices within the radio frame corresponding to {0, 4, 5, 9} in the case of using a frequency division duplex (FDD) scheme in allocating the backhaul downlink subframes or allocating a series of LTE-A subframes, that is, subframes providing an optimal transmission structure for technology suggested in an LTE-A system such as the evolved MIMO (the subframe having the subframe indices corresponding to {0, 1, 5, 6} in the case of using a TDD scheme), that is, the limitation subframes, subframe offsets may be allocated on any radio frame with the exception of the limitation subframes. Here, the downlink or uplink ACK/NACK RTT may be set to 4 ms or 5 ms. The transmission channel may basically use a transmission scheme through a PHICH format on the downlink or a PUCCH format 1a/1b on the uplink each defined in the existing LTE Rel-8. However, in the case in which a problem such as collision at the time of the setting/allocating ACK/NACK resources may occur, the transmission may also be made through the PDSCH or the PUSCH.

As another exemplary embodiment, the relay station may change the setting of the limitation subframe in which essential access downlink transmission to the relay user equipment (for example, PSS/SSS, PBCH, paging channel transmission) should be performed or the physical channel transmission or the physical signal transmission scheme in the limitation subframe.

As a method of changing the setting of the limitation subframe, a method of changing a position of the limitation subframe within any radio frame according to the backhaul link or the HARQ cycle in the LTE-A subframe may be used. For example, the subframe indices of the limitation subframe set to {0, 4, 5, 9} in the case of using the FDD scheme and the subframe indices of the limitation subframe set to {0, 1, 5, 6} in case of using the TDD scheme may be changed into even-numbered subframe indices including 0 or odd-numbered subframe indices. More specifically, the subframe indices of the limitation subframes in the FDD may be changed from {0, 4, 5, 9} to {0, 4, 6, 8}, {0, 2, 4, 6}, {0, 2, 6, 8}, {1, 3, 5, 7}, {1, 3, 7, 9} or {1, 5, 7, 9}.

As a method of changing the physical channel transmission or the physical signal transmission scheme in the limitation subframe, a method of allowing the backhaul subframe or the LTE-A subframe to be used without performing PSS, SSS, PBCH, system information, or paging channel transmission in a collision subframe in the case in which the collision subframe is generated due to overlap between the subframe allocated to the backhaul link or the LTE-A subframe and the limitation subframes may be used.

Figure 21:
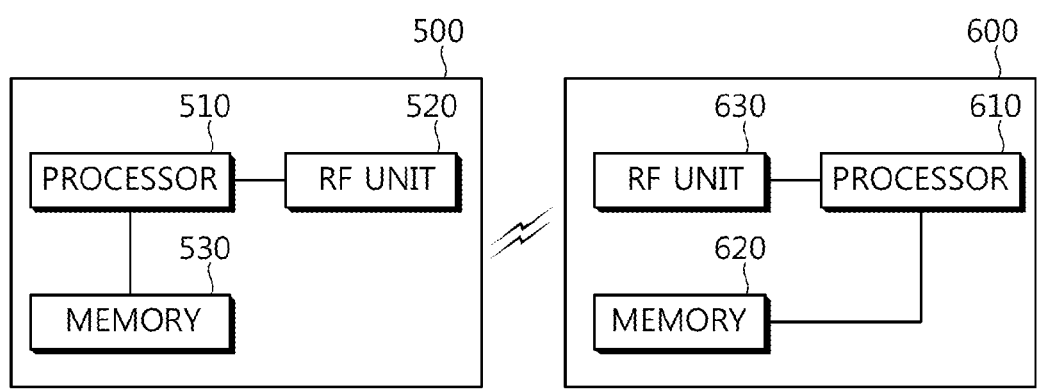
FIG. 21 is a block diagram showing a radio communications system implementing exemplary embodiments of the present invention.

FIG. 21 is a block diagram showing a radio communications system implementing the exemplary embodiments of the present invention. The base station 500 includes a processor 510, a memory 530, and a radio frequency (RF) unit 520. The processor 510 allocates the subframes to the backhaul link and supports the HARQ operation. A procedure, a method, and a function performed by the base station among the above-mentioned exemplary embodiments may be implemented by the processor 510. A memory 530 is connected to the processor 510 to thereby store a variety of information for driving the processor 510 therein. The RF unit 520 is connected to the processor 510 to thereby transmit and/or receive radio signals. The base station may become a source station or a destination station.

The user equipment 600 includes a processor 610, a memory 620, and a RF unit 630. The processor 610 supports the HARQ operation and transmits the uplink data or the ACK/NACK. A procedure, a method, and a function performed by the user equipment among the above-mentioned exemplary embodiments may be implemented by the processor 610. A memory 620 is connected to the processor 610 to thereby store a variety of information for driving the processor 610 therein. The RF unit 630 is connected to the processor 610 to thereby transmit and/or receive radio signals. The user equipment may become a source station or a destination station. In addition, although the user equipment has been described as an example, the relay station may be implemented to have the same configuration as that of the user equipment.

The processors 510 and 610 may include application-specific integrated circuits (ASICs), other chip sets, logical circuits and/or data processing devices. The memories 530 and 620 may include read only memories (ROMs), random access memories (RAMs), flash memories, memory cards, storage media, and/or other storing devices. The RF units 520 and 630 may include baseband circuits for processing the radio signals. When the exemplary embodiments are implemented by a software, the above-mentioned method may be implemented by a module (a process, a function, or the like) performing the above-mentioned function. The module may be stored in the memories 530 and 620 and be executed by the processors 510 and 610. The memories 530 and 620 may be positioned inside or outside the processors 510 and 610 and be connected to the processors 510 and 610 through various well known units.

In the above-mentioned exemplary system, methods have been described based on a flowchart as a series of steps or blocks. However, the present invention is not limited to the sequence of steps. That is, any step may be performed in a step and a sequence different from the above-mentioned step and sequence or several steps may be simultaneously performed. In addition, it may be appreciated by those skilled in the art that the steps shown in the flowchart are not exclusive and other steps may be added to the flowchart or at least one step may be deleted from the flowchart without departing from the scope of the present invention.

Although the present invention has been described with reference to the exemplary embodiments thereof, those skilled in the art may appreciate that various modifications and alterations are made without departing from the scope and spirit of the present invention. Therefore, the present invention is not limited to the above-mentioned embodiments but is intended to include all embodiments that fall within the following claims.

The invention claimed is:

1. A method for allocating subframes in a wireless communication system that performs communication by using a radio frame including a plurality of subframes, the method comprising:

receiving an uplink grant in a backhaul downlink subframe #n (n being a integer number), wherein the uplink grant comprises an offset value;

transmitting uplink data based on the uplink grant in a backhaul uplink subframe #(n+4); and determining a backhaul downlink subframe in which an acknowledgement/not-acknowledgement (ACK/NACK) for the uplink data is to be received, wherein when a backhaul downlink subframe #(n+8) is a limitation subframe and the offset value indicates one subframe, the determined backhaul downlink subframe is a subframe shifted from the backhaul downlink subframe #(n+8) by the offset value and the ACK/NACK is received in the determined backhaul downlink subframe, and wherein when the backhaul downlink subframe #(n+8) is the limitation subframe and the offset value indicates more than one subframe, the determined backhaul downlink subframe is the backhaul downlink subframe #(n+8) and the backhaul downlink subframe #(n+8) is punctured, and wherein the limitation subframe is a subframe in which essential information for a relay user equipment is transmitted.

2. The method of claim 1, wherein the radio frame is configured of ten subframes and the ten subframes sequentially have subframe indices from 0 to 9.

3. The method of claim 2, wherein the limitation subframes are subframes having any one of the subframe indices within the radio frame corresponding to 0, 4, 5, and 9 when the wireless communication system is operated in a frequency division duplex (FDD) scheme.

4. The method of claim 2, wherein the limitation subframes are subframes having any one of the subframe indices within the radio frame corresponding to 0, 1, 5, and 6 when the wireless communication system is operated in a time division duplex (TDD) scheme.

5. The method of claim 1, wherein the determined subframe is an initially positioned subframe among subframes positioned after the backhaul downlink sub frame #(n+8).

6. The method of claim 1, wherein the determined subframe is a last positioned subframe among subframes positioned before the backhaul downlink subframe #(n+8).

7. The method of claim 1, wherein the determined subframe is a subframe temporally closest to the backhaul downlink subframe #(n+8).

8. The method of claim 1, wherein the uplink data is transmitted through a physical uplink shared channel (PUSCH) and the ACK/NACK is received through a physical hybrid-ARQ indicator channel (PHICH).

9. The method of claim 1, wherein the uplink grant is received through a physical downlink control channel (PDCCH).

10. The method of claim 1, wherein the offset value indicates an interval of subframes that are to be shifted from the backhaul downlink subframe #(n+8).

11. An apparatus comprising:

a radio frequency (RF) unit transmitting and receiving radio signals; and a processor connected to the RF unit, wherein the processor is configured for:

receiving an uplink grant in a backhaul downlink subframe #n (n is a integer number), wherein the uplink grant comprises an offset value;

transmitting uplink data based on the uplink grant in a backhaul uplink subframe #(n+4); and determining a backhaul downlink subframe in which an acknowledgement/not-acknowledgement (ACK/NACK) for the uplink data is to be received, wherein when a backhaul downlink subframe #(n+8) is a limitation subframe and the offset value indicates one subframe, the determined backhaul downlink subframe is a subframe shifted from the backhaul downlink subframe #(n+8) by the offset value and the ACK/NACK is received in the determined backhaul downlink subframe, and wherein when the backhaul downlink subframe #(n+8) is the limitation subframe and the offset value indicates more than one subframe, the determined backhaul downlink subframe is the backhaul downlink subframe #(n+8) and the backhaul downlink subframe #(n+8) is punctured, and wherein the limitation subframe is a subframe in which essential information for a relay user equipment is transmitted.

12. The apparatus of claim 11, wherein the offset value indicates an interval of subframes that are to be shifted from the backhaul downlink subframe #(n+8).

* * * * *